(12) United States Patent
Karafillis et al.

(10) Patent No.: US 11,319,833 B2
(45) Date of Patent: May 3, 2022

(54) FAN CASE WITH CRACK-ARRESTING BACKSHEET STRUCTURE AND REMOVABLE CONTAINMENT CARTRIDGE

(71) Applicant: General Electric Company, Schenectady, NY (US)

(72) Inventors: Apostolos Karafillis, Lynn, MA (US); Aaron Scheid, Evendale, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/858,251

(22) Filed: Apr. 24, 2020

(65) Prior Publication Data

US 2021/0332717 A1 Oct. 28, 2021

(51) Int. Cl.
*F01D 21/04* (2006.01)

(52) U.S. Cl.
CPC ........ *F01D 21/045* (2013.01); *F05D 2220/32* (2013.01); *F05D 2230/60* (2013.01)

(58) Field of Classification Search
CPC . F01D 21/045; F05D 2220/32; F05D 2230/60
See application file for complete search history.

(56) References Cited

U.S. PATENT DOCUMENTS

| | | | | |
|---|---|---|---|---|
| 4,397,608 A | * | 8/1983 | Husain | F01D 21/045 415/121.2 |
| 4,561,306 A | * | 12/1985 | Marino | F01D 5/025 242/438 |
| 4,878,821 A | * | 11/1989 | Huether | F01D 11/22 415/9 |
| 5,336,044 A | | 8/1994 | Forrester | |
| 5,344,280 A | * | 9/1994 | Langenbrunner | F01D 21/045 415/9 |
| 5,429,477 A | * | 7/1995 | Sikorski | F01D 25/04 415/119 |
| 5,447,411 A | * | 9/1995 | Curley | F01D 21/045 415/9 |
| 6,059,524 A | * | 5/2000 | Costa | F01D 21/045 415/9 |
| 6,468,026 B1 | | 10/2002 | Bonnoitt et al. | |

(Continued)

OTHER PUBLICATIONS

Kevlar, "DuPont Tensylon HA120 in Helmets," Technical Guide for DuPont Tensylon HA120, Retrieved from the Internet on Feb. 27, 2020: <http://images.protectiontechnologies.dupont.com/Web/DuPontInternationalOperationsSarl/%7Be3ea147b-cc3f-40eb-b355-089297f13353%7D_HA120-Technical-Guide-2018.pdf> May 2018, 7 pages.

*Primary Examiner* — J. Todd Newton
*Assistant Examiner* — Theodore C Ribadeneyra
(74) *Attorney, Agent, or Firm* — Hanley, Flight & Zimmerman, LLC

(57) ABSTRACT

A fan case with crack-arresting backsheet structure and removable containment cartridge is disclosed. An example engine fan case includes a segmented backsheet structure, the segmented backsheet structure including at least a first backsheet segment of a first length and a second backsheet segment of a second length, the first backsheet segment coupled to the second backsheet segment and at least one of the first backsheet segment or the second backsheet segment coupled to the fan case, a honeycomb structure, and a containment structure for blade fragment retention, the containment structure coupled to the segmented backsheet structure.

18 Claims, 9 Drawing Sheets

(56) References Cited

U.S. PATENT DOCUMENTS

| | | | | |
|---|---|---|---|---|
| 7,866,440 B2* | 1/2011 | Douglas | | B64D 33/02 181/213 |
| 8,197,191 B2* | 6/2012 | Binks | | B64D 33/02 415/119 |
| 8,206,092 B2* | 6/2012 | Tholen | | F01D 11/08 415/173.1 |
| 8,450,222 B2 | 5/2013 | Pritchard et al. | | |
| 9,714,583 B2 | 7/2017 | Watson | | |
| 9,914,282 B2 | 3/2018 | Roach et al. | | |
| 10,465,707 B2* | 11/2019 | Care | | F04D 29/663 |
| 2004/0045765 A1* | 3/2004 | Porte | | F02K 1/827 181/210 |
| 2004/0146393 A1* | 7/2004 | Evans | | F01D 21/045 415/9 |
| 2005/0220384 A1* | 10/2005 | Plona | | F16C 35/077 384/624 |
| 2012/0039703 A1* | 2/2012 | Swenson | | F01D 21/045 415/9 |
| 2012/0082541 A1* | 4/2012 | Macchia | | F01D 21/045 415/200 |
| 2013/0195635 A1* | 8/2013 | Robertson, Jr. | | F01D 11/16 415/197 |
| 2013/0216367 A1* | 8/2013 | Lussier | | B29C 70/32 415/200 |
| 2015/0354408 A1* | 12/2015 | Snyder | | F01D 25/24 415/196 |
| 2016/0032833 A1 | 2/2016 | Robertson, Jr. et al. | | |
| 2016/0053632 A1* | 2/2016 | Watson | | B23P 15/04 415/9 |
| 2016/0069214 A1* | 3/2016 | Engebretsen | | F01D 21/045 415/196 |
| 2016/0169043 A1* | 6/2016 | Read | | F01D 11/127 415/173.3 |
| 2016/0201505 A1* | 7/2016 | Clarkson | | F01D 25/243 415/200 |
| 2016/0281271 A1 | 8/2016 | Shahkarami et al. | | |
| 2016/0312795 A1* | 10/2016 | Crall | | F04D 29/023 |
| 2016/0356286 A1* | 12/2016 | Finlayson | | F01D 21/045 |
| 2017/0044934 A1* | 2/2017 | Hicklin | | B29C 65/4835 |
| 2017/0191498 A1* | 7/2017 | Guijarro Valencia | | F04D 29/321 |
| 2017/0198606 A1* | 7/2017 | Nelboeck | | F01D 25/14 |
| 2017/0198714 A1* | 7/2017 | Lin | | B32B 5/02 |
| 2018/0066675 A1 | 3/2018 | Kappes et al. | | |
| 2018/0195527 A1* | 7/2018 | Kray | | F01D 21/045 |
| 2018/0230855 A1 | 8/2018 | Heeter | | |
| 2018/0298780 A1 | 10/2018 | Kray et al. | | |
| 2018/0298915 A1 | 10/2018 | Kray et al. | | |
| 2018/0334922 A1* | 11/2018 | Kray | | F01D 21/045 |

* cited by examiner

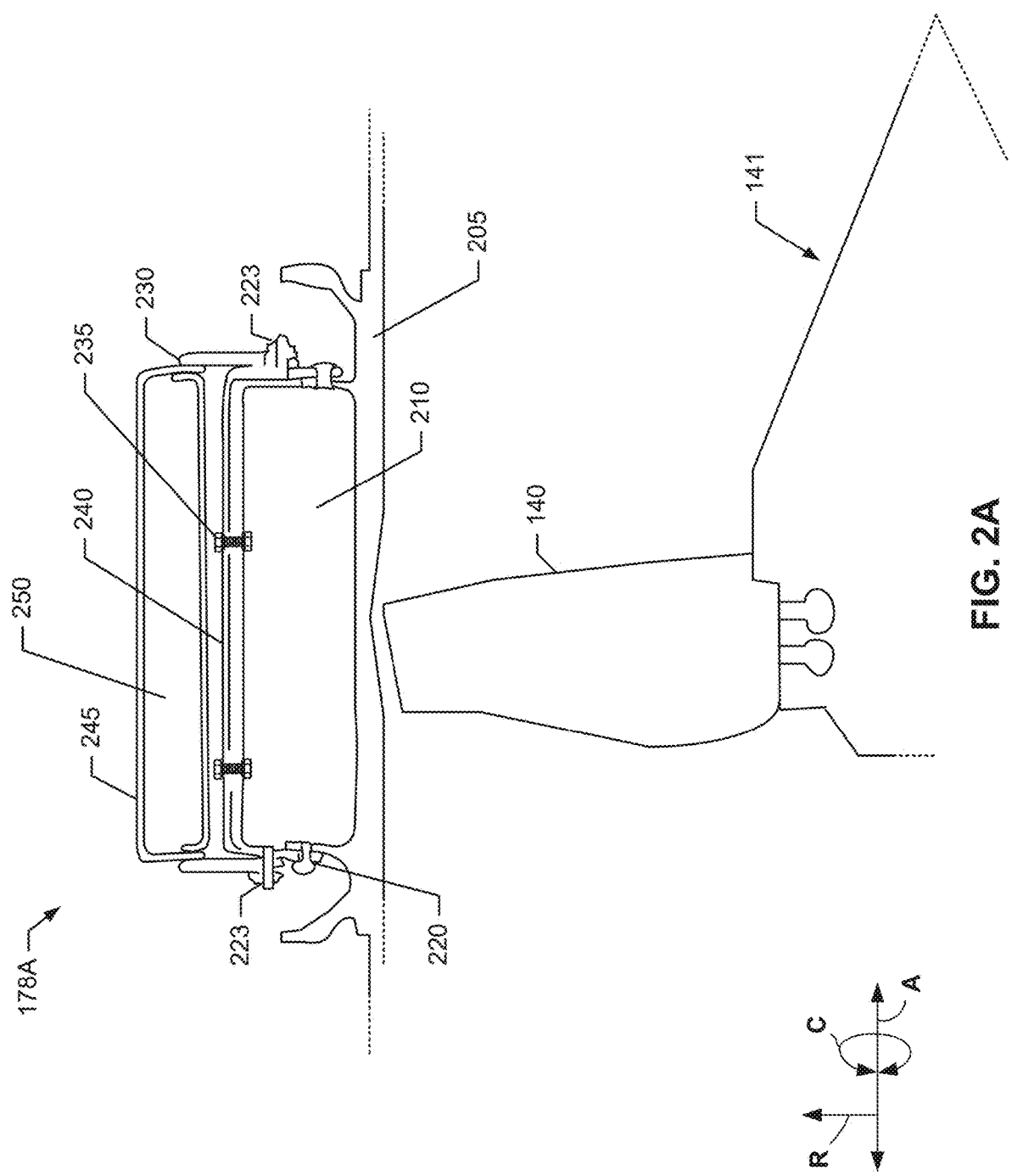

FAN CASE WITH CRACK-ARRESTING BACKSHEET STRUCTURE AND REMOVABLE CONTAINMENT CARTRIDGE

FIELD OF THE DISCLOSURE

This disclosure relates generally to turbine engines and, more particularly, to an engine fan case with a crack-arresting backsheet structure and a removable containment cartridge.

BACKGROUND

Turbine engines are some of the most widely-used power generating technologies. Gas turbines are an example of an internal combustion engine that uses a burning air-fuel mixture to produce hot gases that spin the turbine, thereby generating power. Application of gas turbines can be found in aircraft, trains, ships, electrical generators, gas compressors, and pumps. Modern aircraft rely on a variety of gas turbine engines as part of a propulsion system to generate thrust, including a turbojet, a turbofan, a turboprop, and an afterburning turbojet. Such engines include a combustion section, a compressor, a turbine, and an inlet, providing high power output with a high thermal efficiency.

A fan case in the gas turbine provides the outer flow path for air passing through the fan. In addition to set structural requirements, the fan case and/or fan containment system must be able to contain a released blade during a fan blade-out event, which occurs when damage to the blades results in the blade and/or blade fragment being dislodged and flying radially outward at high velocity. There is a risk of rapid crack propagation in the fan case from damage caused by the broken blade impact. Accordingly, a fan case to eliminate crack propagation during a fan blade-out event would be welcomed in the technology.

BRIEF DESCRIPTION OF THE DRAWINGS

FIGS. 2A-2B illustrate example cross-sections of a gas engine fan case blade containment section that can be utilized within the example gas turbine engine of FIG. 1.

The figures are not to scale. Wherever possible, the same reference numbers will be used throughout the drawing(s) and accompanying written description to refer to the same or like parts.

BRIEF SUMMARY

Figure 1:
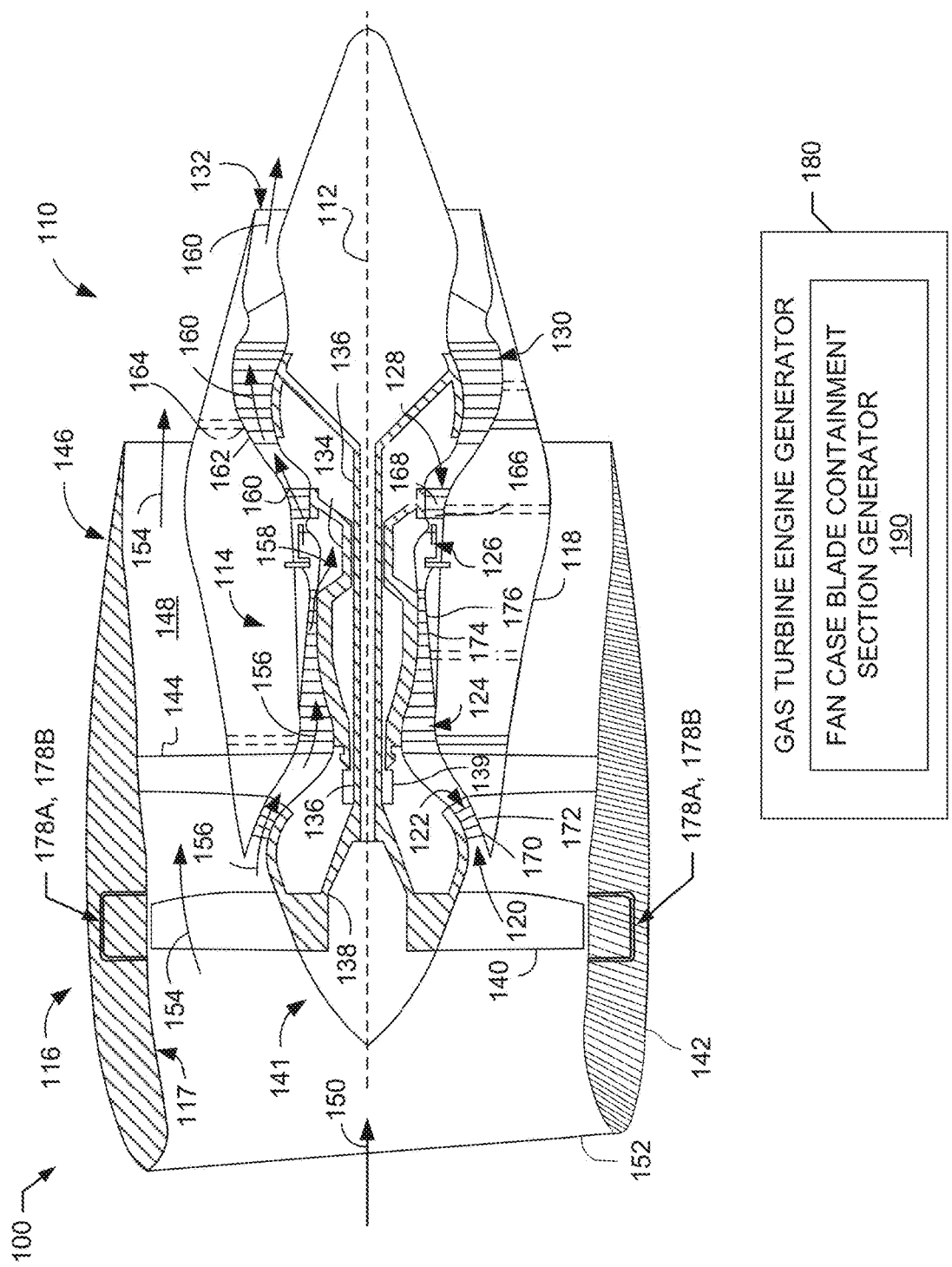
FIG. 1 is a schematic cross-sectional view of an example high-bypass turbofan-type gas turbine engine.

A gas engine fan case with a crack-arresting backsheet structure and a removable containment cartridge is disclosed.

Certain examples provide an engine fan case including a segmented backsheet structure. The segmented backsheet structure includes at least a first backsheet segment of a first length and a second backsheet segment of a second length. The backsheet segments are coupled to each other and to the fan case. The backsheet structure includes a honeycomb structure, the first and second backsheet segments coupled to the honeycomb structure. The backsheet structure includes a containment structure for blade fragment retention, the containment structure coupled to the segmented backsheet structure.

Certain examples provide a method of securing a backsheet structure to a containment cartridge. The method includes positioning segmented backsheet sections in asymmetrical overlaps, the segmented sections having varying lengths. The method of securing a backsheet structure to a containment cartridge also includes riveting the segmented sections at the asymmetrical overlaps to form the backsheet structure and bonding the riveted section overlaps to a fan case honeycomb structure. The method further includes removably coupling the containment cartridge to the backsheet structure to allow replacement of the cartridge, the containment cartridge axially retained with brackets.

Certain examples provide an engine fan case including means for shrouding a rotor blade coupled to a honeycomb structure, and means for retaining a rotor blade fragment. The means for retaining the rotor blade fragment are removably coupled to the means for shrouding the rotor blade, and the means for retaining the rotor blade fragment include a blade fragment containment material wrapped in a fire-retarding material.

DETAILED DESCRIPTION

Turbine engine components can degrade over time due to demanding operating conditions such as extreme temperature and vibration. In some instances, debris or other objects enter the turbine engine via the fan and cause damage to one or more components. Therefore, routine maintenance intervals and service checks are used to inspect for degradation and/or damage. In the example of an aircraft turbine engine, such damage can be the result of a failed fan blade within the engine. In order to prevent injury to passengers and the airframe, jet engines must be designed to contain a failed fan blade (e.g., a fan blade that breaks off or otherwise separates during operation) through the use of a fan case structure that can withstand blade impact while also retaining its structural integrity while the engine is shutting down. During engine operation, the fan blades can be impacted and/or damaged by foreign objects (e.g., birds, debris, etc.). Such impacts can damage the blades, resulting in the blade and/or blade fragment being dislodged and flying radially outward at high velocity. An engine that loses a blade has an increased load on the fan case which surrounds it, such that the loads are higher than those generally present during normal flight as a result of fan imbalance. As the engine begins to shut down (e.g., over a period of 15 seconds), there is a risk of rapid crack propagation in the fan case from damage caused by the broken blade impact. Cracks emanating from the fan case can cause release of stator fragments from the engine which, in turn, can cause secondary engine or aircraft damage.

Current commercial engines with titanium fan blades rely on hardwall fan cases (e.g., made of metal alloys) or softwall fan cases (e.g., metal alloy case overwrapped with aramid fibers using woven or braided fibers). Overall, the fan case design can depend on the need to obtain engine-based higher bypass ratios for improved efficiency, reduced noise, and reduced fuel consumption. Likewise, high impact resistance and low fabrication cost are advantageous when designing the fan case compartment. Improved blade containment and crack propagation resistance are primary areas of focus during fan case compartment development. Properly containing the fan blade during a fan blade-out event is crucial to maintaining safety and ensuring the structural integrity of the aircraft engine. A fan case with a crack-arresting structure and a removable containment cartridge would provide fan case stability and blade containment advantages over existing fan case designs.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an example implementation and not to be taken limiting on the scope of the subject matter described in this disclosure. Certain features from different aspects of the following description may be combined to form yet new aspects of the subject matter discussed below.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

As used herein, the terms "system," "unit," "module,", "engine,", "component," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, or system may include a hard-wires device that performs operations based on hard-wired logic of the device. Various modules, units, engines, and/or systems shown in the attached figures may represent the hardware that operates based on software or hardwired instructions, the software that directs hardware to perform the operations, or a combination thereof. Additionally, the terms "first", "second", and "third" are used interchangeably herein to distinguish one component from another and are not intended to signify a location or importance of the individual components.

A turbine engine, also called a combustion turbine or a gas turbine, is a type of internal combustion engine. Turbine engines are commonly utilized in aircraft and power-generation applications. As used herein, the terms "asset," "aircraft turbine engine," "gas turbine," "land-based turbine engine," and "turbine engine" are used interchangeably. A basic operation of the turbine engine includes an intake of fresh atmospheric air flow through the front of the turbine engine with a fan. In some examples, the air flow travels through an intermediate-pressure compressor or a booster compressor located between the fan and a high-pressure compressor. The booster compressor is used to supercharge or boost the pressure of the air flow prior to the air flow entering the high-pressure compressor. The air flow can then travel through the high-pressure compressor that further pressurizes the air flow. The high-pressure compressor includes a group of blades attached to a shaft. The blades spin at high speed and subsequently compress the air flow. The high-pressure compressor then feeds the pressurized air flow to a combustion chamber. In some examples, the high-pressure compressor feeds the pressurized air flow at speeds of hundreds of miles per hour. In some instances, the combustion chamber includes one or more rings of fuel injectors that inject a steady stream of fuel into the combustion chamber, where the fuel mixes with the pressurized air flow.

In the combustion chamber of the turbine engine, the fuel is ignited with an electric spark provided by an igniter, where the fuel in some examples burns at temperatures of more than 2000 degrees Fahrenheit. The resulting combustion produces a high-temperature, high-pressure gas stream (e.g., hot combustion gas) that passes through another group of blades called a turbine. A turbine includes an intricate array of alternating rotating and stationary airfoil-section blades. As the hot combustion gas passes through the turbine, the hot combustion gas expands, causing the rotating blades to spin. The rotating blades serve at least two purposes. A first purpose of the rotating blades is to drive the booster compressor and/or the high-pressure compressor to draw more pressured air into the combustion chamber. For example, the turbine is attached to the same shaft as the high-pressure compressor in a direct-drive configuration, thus, the spinning of the turbine causes the high-pressure compressor to spin. A second purpose of the rotating blades is to spin a generator operatively coupled to the turbine section to produce electricity. For example, the turbine can generate electricity to be used by an aircraft, a power station, etc.

In the example of an aircraft turbine engine, after passing through the turbine, the hot combustion gas exits the aircraft turbine engine through a nozzle at the back of the aircraft turbine engine. As the hot combustion gas exits the nozzle, the aircraft turbine engine and the corresponding aircraft coupled to the aircraft turbine engine are accelerated forward (e.g., thrusted forward). In the example of a land-based turbine engine, after passing through the turbine, the hot combustion gas is dissipated, used to generate steam, etc.

Referring now to the drawings, wherein identical numerals indicate the same elements throughout the figures, FIG. 1 is a schematic cross-sectional view of an example high-bypass turbofan-type gas turbine engine 110 ("turbofan 110"). As shown in FIG. 1, the turbofan 110 defines a longitudinal or axial centerline axis 112 extending therethrough for reference. In general, the turbofan 110 includes a core turbine or gas turbine engine 114 disposed downstream from a fan case 117.

The core turbine engine 114 generally includes a substantially tubular outer casing 118 that defines an annular inlet 120. The outer casing 118 can be formed from a single casing or multiple casings. The outer casing 118 encloses, in serial flow relationship, a compressor section having a booster or low pressure compressor 122 ("LP compressor 122") and a high pressure compressor 124 ("HP compressor 124"), a combustion section 126, a turbine section having a high pressure turbine 128 ("HP turbine 128") and a low pressure turbine 130 ("LP turbine 130"), and an exhaust section 132. A high pressure shaft or spool 134 ("HP shaft 134") drivingly couples the HP turbine 128 and the HP compressor 124. A low pressure shaft or spool 136 ("LP shaft 136") drivingly couples the LP turbine 130 and the LP compressor 122. The LP shaft 136 can also couple to a fan spool or shaft 138 of the fan case 117. In some examples, the LP shaft 136 is coupled directly to the fan shaft 138 (e.g., a direct-drive configuration). In alternative configurations, the LP shaft 136 can couple to the fan shaft 138 via a reduction gear 139 (e.g., an indirect-drive or geared-drive configuration).

As shown in FIG. 1, the fan section 116 includes a fan case 117 and a plurality of fan blades 140 coupled to and extending radially outwardly from the fan shaft 138. An annular fan casing or nacelle 142 circumferentially encloses the fan section 116 and/or at least a portion of the core turbine 114. The nacelle 142 can be supported relative to the core turbine 114 by a plurality of circumferentially-spaced apart outlet guide vanes 144. Furthermore, a downstream section 146 of the nacelle 142 can enclose an outer portion of the core turbine 114 to define a bypass airflow passage 148 therebetween.

As illustrated in FIG. 1, air 150 enters an inlet portion 152 of the turbofan 110 during operation thereof. A first portion 154 of the air 150 flows into the bypass flow passage 148, while a second portion 156 of the air 150 flows into the inlet 120 of the LP compressor 122. One or more sequential stages of LP compressor stator vanes 170 and LP compressor rotor blades 172 coupled to the LP shaft 136 progressively compress the second portion 156 of the air 150 flowing through the LP compressor 122 en route to the HP compressor 124. Next, one or more sequential stages of HP compressor stator vanes 174 and HP compressor rotor blades 176 coupled to the HP shaft 134 further compress the second portion 156 of the air 150 flowing through the HP compressor 124. This provides compressed air 158 to the combustion section 126 where it mixes with fuel and burns to provide combustion gases 160.

The combustion gases 160 flow through the HP turbine 128 where one or more sequential stages of HP turbine stator vanes 166 and HP turbine rotor blades 168 coupled to the HP shaft 134 extract a first portion of kinetic and/or thermal energy therefrom. This energy extraction supports operation of the HP compressor 124. The combustion gases 160 then flow through the LP turbine 130 where one or more sequential stages of LP turbine stator vanes 162 and LP turbine rotor blades 164 coupled to the LP shaft 136 extract a second portion of thermal and/or kinetic energy therefrom. This energy extraction causes the LP shaft 136 to rotate, thereby supporting operation of the LP compressor 122 and/or rotation of the fan shaft 138. The combustion gases 160 then exit the core turbine 114 through the exhaust section 132 thereof.

In each of the turbofan, turbojet, and unducted engines, a speed reduction device (e.g., the reduction gearbox 139) can be included between any shafts and spools. For example, the reduction gearbox 139 is disposed between the LP shaft 136 and the fan shaft 138 of the fan section 116.

The turbofan 110 includes an example fan case blade containment section 178A and/or 178B that circumscribes and surrounds the fan 141 and the fan blades 140 to retain fan blades 140 and/or fan blade fragments dislodged from the engine fan 141 (e.g., during a blade-out event). During a blade-out event, the fan blade or blade fragment is released from a rotor of the turbofan engine. A sudden release of the fan blade can impact a surrounding fan case with a substantial amount of force, such that the resulting loads on the fan case can cause circumferential cracking of the fan case 117. As such, the fan case 117 guides air pushed by the fan blades 140 while also providing a protective band (e.g., fan case blade containment section 178A) that retains blade fragments when they become loose during a blade-out event, causing the fan blade 140 to be released from the fan rotor. In some examples, the fan case 117 includes a metallic shroud, a composite reinforcement, and/or sound attenuation devices (e.g., dampers). Overall, the fan case blade containment section 178A and/or 178B is intended to prevent high-energy blade fragments from escaping the containment section 178A and/or 178B to prevent damage to other engines and/or to the fuselage of the aircraft. Therefore, the fan case blade containment section 178A and/or 178B must be designed to contain a fan blade at its maximum permissible rotation speed. As such, the design of the blade containment section 178A and/or 178B can be based on blade weight, shape, and rotating speed. Likewise, additional parameters to consider include rotor rotating speed, case temperature, and stress, in addition to the mass, shape, and center of gravity of the failed blades. In some examples, the fan case blade containment section 178A and/or 178B can include the use of a sufficiently thick, solid metallic covering that the blade cannot penetrate (e.g., a hardwall containment). For example, a highly ductile steel can arrest the kinetic energy of the blade through plastic deformation and/or a controlled amount of cracking. In some examples, a Kevlar® fiber wrap (e.g., synthetic fiber of high tensile strength used as a reinforcing agent) can be used to reduce weight (e.g., a softwall containment), such that a thinner metallic wall provides some containment and is backed by stretching of Kevlar® fibers. In such examples, the nacelle 142 that circumferentially surrounds the fan 141 and/or at least a portion of the gas turbine engine core requires the presence of empty volume to allow for expansion. The weight reduction associated with using a softwall containment as opposed to a hardwall containment translates into fuel burn savings, increased payloads, and greater aircraft range, given that the fan case contributes significantly to the overall engine weight.

The example gas turbine engine generator 180 of FIG. 1 can include hardware, software, firmware, robots, machines, etc. structured to generate the turbofan 110 of FIG. 1. The gas turbine engine generator 180 can generate engine design, test engine designs, and/or generate the example turbofan 110 based on the generated and/or tested engine design. The example gas turbine engine generator 180 includes an example fan case blade containment section generator 190 to generate a design for a backsheet structure and/or a containment structure, in order to implement the example fan case blade containment section 178A and/or 178B using a backsheet structure generator and/or a containment structure generator, as described in more detail in association with FIG. 4.

Figure 2B:
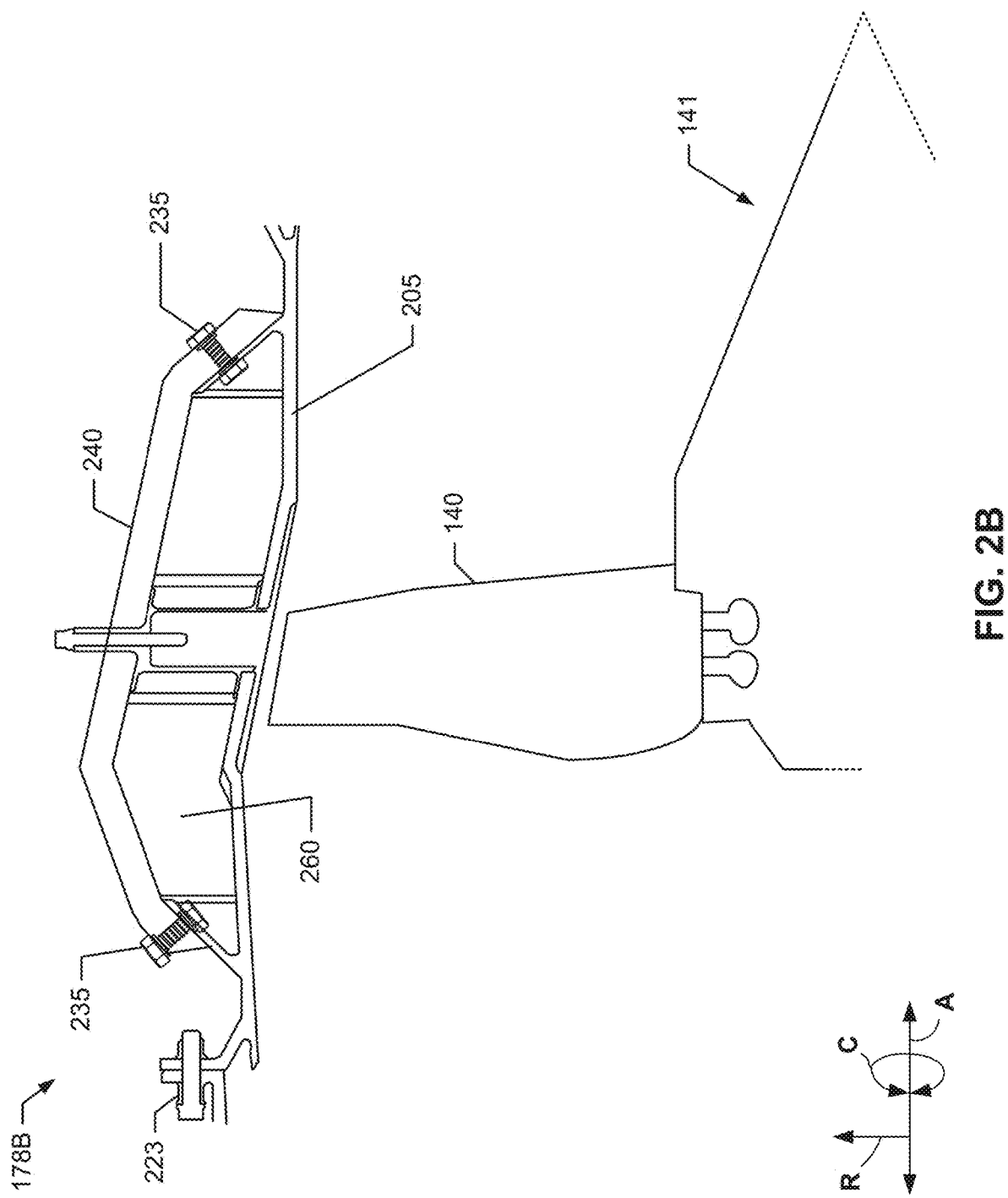

FIGS. 2A-2B illustrate example cross-sections of a gas engine fan case blade containment section 178A and 178B that can be utilized within the turbofan 110 of FIG. 1. As depicted therein, the containment section 178A, 178B defines an axial direction A, a radial direction R, and a circumferential direction C. In general, the axial direction A extends parallel to the longitudinal axis 112, the radial direction R extends orthogonally outwardly from the longitudinal axis 112, and the circumferential direction C extends concentrically around the longitudinal axis 112. In FIG. 2A, the fan case blade containment section 178A circumscribes and surrounds the fan 141 and the fan blades 140 to retain fan blades 140 or fan blade fragments dislodged from the engine fan 141 (e.g., during a blade-out event). The fan case blade containment section 178A includes a fan case 205, an example honeycomb structure 210, a segmented backsheet structure 240, and a removable containment cartridge 245 (e.g., the containment structure including the containment cartridge). The fan case 205 can be made of a metallic material (e.g., aluminum, steel, etc.) and is designed to allow high energy debris (e.g., broken blade 140 and/or blade fragment) to penetrate through the fan case 205 and lodge within the adjacent containment cartridge 245 for containment of the debris. Given a softwall containment structure that is disclosed herein, the fan case 205 is designed to allow blade 140 penetration, whereas a fan case used in a hardwall containment structure would be designed to withstand blade 140 impact and penetration. A softwall fan case can include an aluminum casing that is encapsulated in dry aramid fibers. Such a design allows a broken fan blade to pass through an aluminum component, which stops the blade 140 such that the blade 140 can be contained within the external aramid fiber wrap. Conversely, a hardwall fan case can be composed of aluminum only and designed to reflect the broken blade or blade fragment back into the engine. While the engine aerodynamics can be improved using a hardwall design due to a smaller radial envelope, there is a risk of the broken blade or blade fragment passing through the engine and causing further damage that is otherwise mitigated by the use of a softwall fan case design. Additionally, the softwall fan case design (e.g., using a fabric wrap) can be a lighter weight option for certain aircraft engines.

In FIG. 2A, the innermost surface of the fan case 205 is positioned closer to the fan blade 140 in the radial direction, whereas the outermost surface of the fan case 205 is joined or bonded directly to the honeycomb structure 210. The honeycomb structure 210 provides noise attenuation when the turbine turbofan 110 is in operation. The honeycomb structure 210 can be fixedly joined or bonded directly to the fan case 205. The honeycomb structure 210 can also include a para-aramid material such as Kevlar®, and/or a meta-aramid material such as Nomex®, the materials having a cellular form structure in the form of a honeycomb, providing high structural strength with minimum weight. As such, the honeycomb structure 210 allows for a reduction in the total weight of the fan case blade containment section 178A, while also providing energy absorption when impacted by a high energy projectile (e.g., a broken-off blade and/or blade fragment) in the turbofan 110. The blade 140 impact can be absorbed by the honeycomb structure 210, allowing the blade to lodge within the containment structure 245, positioned adjacent to the honeycomb structure 210 in the radial direction. In FIG. 2A, the honeycomb structure 210 is joined or bonded directly to a backsheet structure 240, with the removable containment structure 245 coupled to the backsheet structure 240, as described in further detail below.

Since a softwall design allows the blade 140 to penetrate the fan case 117 such that the blade 140 is contained by multiple layers of fabric that wrap the case, the fan case 117 must likewise allow the blade 140 to penetrate with a minimum size hole and a minimum amount of secondary damage (e.g., crack propagation and/or delamination). As such, the softwall case should be designed to resist crack formation or allow for crack propagation in a stable and controlled manner without compromising structural integrity necessary during engine spool down (e.g., time taken by gas engine to come to a holt). For example, due to damage from strains induced during large applied loads (e.g., a fan blade out event), the damage can propagate to form an extended 360 degree crack. The segmented backsheet structure 240 and the removable containment cartridge 245 introduce controls to limit such damage (e.g., preventing an extended crack propagation) as well as properly contain the fan blade during a fan blade-out event, thereby maintaining safety and ensuring the structural integrity of the aircraft engine.

The backsheet structure 240 is positioned radially outward from the honeycomb structure 210. The backsheet structure 240 can be made of a variety of materials, including aluminum, a polymer matrix composite (PMC), carbon fiber, and/or titanium, among others. In FIGS. 2A-2B, the backsheet structure 240 is segmented such that the backsheet structure 240 includes a first and a second backsheet segment coupled to the honeycomb structure 210, as described in greater detail in connection with FIG. 3. For example, the backsheet structure 240 can include at least a first backsheet segment of a first length and a second backsheet segment of a second length, with the backsheet segments coupled to each other and to the fan case 205. The backsheet structure 240 can also include a third backsheet segment of a third length, such that the spacing between the first backsheet segment and the second backsheet segment is asymmetric relative to the spacing between the second backsheet segment and the third backsheet segment. As described further in connection with FIG. 3, the backsheet segments are circumferentially-coupled using at least one of a shiplap, a double-shiplap, or a double overlap connection. In FIG. 2A, the backsheet structure 240 can be joined to the honeycomb structure 210 using example bolts 235. In some examples, a fastener, a nut, a high lock, and/or any other type of securing device can be used in place of the bolt 235. In FIG. 2A, the backsheet segments are axially-coupled to the fan case 205 using one or more fasteners 220, including, for example, a stud and/or a bolt. The segmented backsheet structure 240 can be made of an aluminum, a polymer matrix composite, or a titanium material.

Segmentation of the backsheet structure 240 can be determined based on the level of segmentation needed to attain circumferential crack-arresting of the backsheet structure 240. Determining segmentation of the backsheet structure 240 includes determining the type and/or level of segmentation that will produce a high modal stiffness of the backsheet structure 240. Furthermore, segmentation can be determined with the intention of producing resistance to crack propagation and/or a vibratory mode (e.g., the vibratory mode can include traveling wave-induced crack propagation). While uniform segmentation can resist crack propagation without providing substantial modal resistance, non-uniform segmentation can provide resistance to both crack propagation and vibratory mode-induced propagation. As such, backsheet segmentation can help prevent segment-to-segment crack propagation as well as help determine effects of a segmentation pattern on modal response (e.g., to determine a pattern resulting in high modal stiffness). Modal analysis can be carried out to capture the backsheet structure 240 stiffness, mass distribution, and irregularities. For example, blade 140 vibration can cause crack propagation, increasing the possibility of the blades 140 being in resonance range. Conditions that cause vibratory modes (e.g., which initiate fan blade 140 entry to the resonance range) can be studied using modal analysis. Such vibrations can include free vibrations and force vibrations, which permit assessment of backsheet structure fatigue behavior to determine resistance to crack propagation. Vibration analyses can then be used to determine the extent of fan case backsheet 240 resistance to crack propagation and/or vibratory mode formation (e.g., traveling waves formed as a result of resonance), thereby determining the level of segmentation that is optimal for prevention of crack-propagation and/or vibratory mode formation. As such, the segmented backsheet structure 240 is designed to stop the propagation of crack formation, given that the initiation of a crack in one segment will be prevented from propagating into the subsequent segment(s) given the irregularity of the surface. The removable containment cartridge 245 is designed to enable a broken blade and/or blade fragment to lodge within the containment cartridge, permitting blade fragment retention. The containment structure 245 can be removably coupled to the segmented backsheet structure 240. For example, the containment cartridge 245 can be axially retained with one or more bracket(s) (e.g., bracket(s) 223 and/or 230). The containment cartridge 245 can include a containment material 250 wrapped in a fire-retarding material to retain any blade fragments. Furthermore, the containment material 250 can be any material with a high energy absorption capability and/or a material that can be replaced periodically. In some examples, the containment material 250 is encapsulated in fiberglass. In the event that the gas turbine engine is intended for operation at subsonic conditions (e.g., a subsonic turbofan), the containment material 250 can be, for example, Ultra High Molecular Weight Polyethylene (UHMWPE) (e.g., DuPont™ Tensylon® HA120 and/or other UHMWPE material).

UHMWPE fibers are the strongest and lightest fibers available, providing a combination of high strength and low density. Under subsonic conditions, the use of UHMWPE provides a 30-40% weight benefit compared to conventional aramid fibers. Given that the maximum continuous operating temperature of the UHMWPE is approximately 180 degrees Fahrenheit, the use of UHMWPE in the containment structure 245 is intended for the lower-temperature subsonic conditions (e.g., speeds below 343.2 m/s (1,126 ft/s)) as opposed to the higher-temperature supersonic conditions (e.g., speeds above 343.2 m/s (1,126 ft/s)). Advantages of using UHMWPE (e.g., DuPont™ Tensylon® HA120) include a higher containment of blade fragments (e.g., weight savings in fragment protection possible with Tensylon® HA120 are higher than that of Kevlar®). For example, the resistance to penetration upon ballistic impact is generally assessed by a V50 determination (e.g., the projectile impact velocity at which there is a probability of 50% for total target penetration). When compared to Kevlar®, which is the standard choice of material for use in a containment cartridge, Tensylon® has a significantly higher V50 rating (e.g., 750 m/s for a 0.16 ratio of armor areal density to fragment projected areal density (Tensylon®) versus 750 m/s for a 0.23 ratio of armor areal density to fragment projected areal density (Kevlar®)). Likewise, Kevlar® has a lower rate of deformation under similar conditions when compared to Tensylon®, with Tensylon® having significantly higher flexural strength as a function of temperature and sea water soak when compared to, for example, DSM Dyneema®, which is the strongest UHMWPE fiber product. For example, at 70° C. Tensylon® has a flexural strength of about 50 MPa (using ASTM D790 Standard Test Method for Flexural Properties, with a 16:1 standard support span-to-depth ratio used for specimen deflection until rupture), whereas DSM Dyneema® (e.g., DSM Dyneema® HB26) has a flexural strength of about 12 MPa when tested at the same conditions. As such, Tensylon® can be selected as a containment material 250 within the removable fan case containment cartridge 245, allowing the containment material to be replaced as part of routine maintenance. Additionally, the ability to remove the containment cartridge 245 permits more efficient inspections, given that a removable cartridge allows for the examination of the backsheet structure 240 without the need to remove a Kevlar® containment structure, which is bound to the backsheet structure and the fan case and not easily removed for inspection purposes (e.g., in order to determine presence of corrosion, etc.). For example, when the Kevlar® is rigidly attached or bonded to the fan case aluminum, any water leakage into the fan case 117 is not detectable visually unless the Kevlar® is completely removed. The use of a removable containment cartridge (e.g., containment cartridge 245) allows for more efficient and cost-effective inspection and part replacement.

The size of the containment structure 245 for blade fragment retention can be determined based on engine fan blade properties and penetration capability, the blade properties including blade size, blade shape, blade material properties, or blade kinetic energy. Using these parameters, the size of the containment cartridge 245 can be established in order to ensure that retention of a given blade and/or blade fragment is possible based on the expected blade velocity and penetration ability during a blade-off event. By removably coupling the containment cartridge 245 to the fan case backsheet structure 240, the containment cartridge 245 is axially retained with brackets 223 and/or 230. Additionally, the replacement of the cartridge 245 can be performed by removing the brackets 223 and/or 230 axially retaining the cartridge 245 to the fan case backsheet structure 240. The cartridge 245 is exchanged for a new cartridge, and the new cartridge is re-positioned on the backsheet 240 using the brackets 223 and/or 230. As such, the replaceable cartridge 245 can be easily and efficiently exchanged and/or inspected given that it is not directly bonded to the fan case 205 and/or the backsheet structure 240. While in the examples disclosed herein the example fan case blade containment section 178A includes both a segmented backsheet structure 240 and a removable containment structure 245, the fan case 117 can separately include a segmented backsheet structure 240 in combination with a containment cartridge that is bonded to the segmented backsheet structure 240 or a removable containment structure 245 in combination with a non-segmented and/or partially segmented backsheet structure, or another other combination therein.

In FIG. 2B, the softwall fan case blade containment section 178B includes the fan case 205, an example containment wrap layer 260, the segmented backsheet structure 240, and fasteners and/or bolts 235. The fan case 205 can be a metal alloy case overwrapped with aramid fibers (e.g., woven and/or braided Kevlar® fibers, etc.) that form the containment wrap layer 260. As such, the fan case blade containment section 178B can include the segmented backsheet structure 240 overlaying the containment wrap layer 260 without the use of a removable containment structure (e.g., cartridge 245 of FIG. 2A). While the removable cartridge 245 of FIG. 2A allows for the use of materials with a short service life (e.g., UHMWPE, etc.), the containment wrap layer 260 (e.g., aramid fibers, etc.) can be used in conjunction with the segmented backsheet structure 240 without the presence of the removable cartridge 245. For example, the containment wrap layer 260 can be formed using aramid fiber wraps bonded to the fan case 205, such that the fibers are wrapped multiple times around the fan case 205. Additionally, the segmented backsheet structure 240 can be attached to the fan case 205 using joints between the segments and the fan case (e.g., joints that are axial, radial, at a cone angle, etc.). The backsheet structure 240 segments (e.g., non-uniform and/or overlapping segments) can be attached to the fan case 205 using fasteners (e.g., bolts 235) and/or adhesive bonding.

Figure 3:
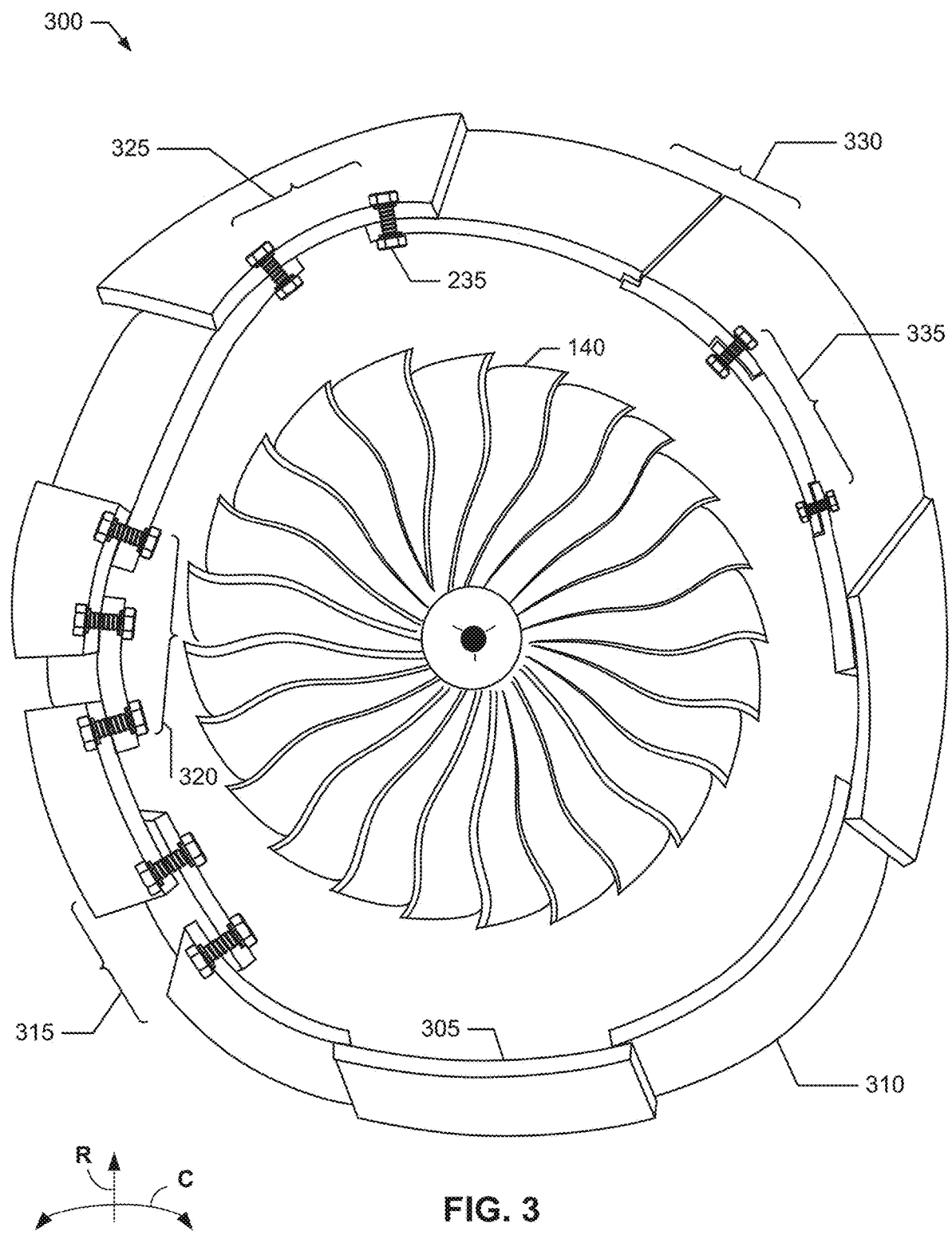
FIG. 3 illustrates an example axial view of a segmented backsheet structure that can be utilized within the example fan case blade containment section of FIGS. 2A-2B.

FIG. 3 illustrates an example axial view 300 of a segmented backsheet structure 240 that can be utilized within the fan case blade containment section of FIGS. 2A-2B. The segmented backsheet 240 includes at least a first backsheet segment of a first length and a second backsheet segment of a second length, with the backsheet segments coupled to each other and to the fan case 205. The backsheet structure 240 can also include a third backsheet segment of a third length, such that the spacing between the first backsheet segment and the second backsheet segment is asymmetric relative to the spacing between the second backsheet segment and the third backsheet segment, as shown in FIG. 3. For example, the segments can be positioned in asymmetrical overlaps to form the backsheet structure 240, such that the segmented sections having varying lengths (e.g., segment length 305 is shorter than segment length 310), as shown in FIG. 3, where the segments are of varying lengths and with varying overlaps. The segmented sections can be riveted to each other at the segment overlap locations, with the riveted segments further bonded to a fan case honeycomb structure 210 of FIG. 2A. The segments can be riveted to each other (e.g., using bolts 235) and further bonded and/or attached to the fan case 205 using bracket(s) 223. The backsheet segments can also be attached to the fan case with radial joints, joints on a conical surface, axial joints, etc. In some examples, adhesive bonding can be used in place of, or in combination with, fasteners (e.g., bolts, rivets, etc.) to attach backsheet segments to the fan case and/or to attach the backsheet segments to each other. The varied, asymmetric spacing of the backsheet segments can be accomplished using a variety of connections, including, but not limited to, a wide shingle 315, a tight shingle 320, a double overlap 325, a single shiplap 330, and/or a double shiplap with a connector 335. Such connections allow for the formation of unequal spacing of the backsheet segments that prohibits the formation of uniform peaks in the modal and/or resonant deflections (e.g., deflections which promote crack propagation). The segmented backsheet structure (e.g., using overlapping and/or non-uniform segments) permits greater resistance to vibratory mode formation (e.g., traveling waves formed as a result of resonance) as well as consequential and independent prevention of crack propagation between segments.

Figure 4:
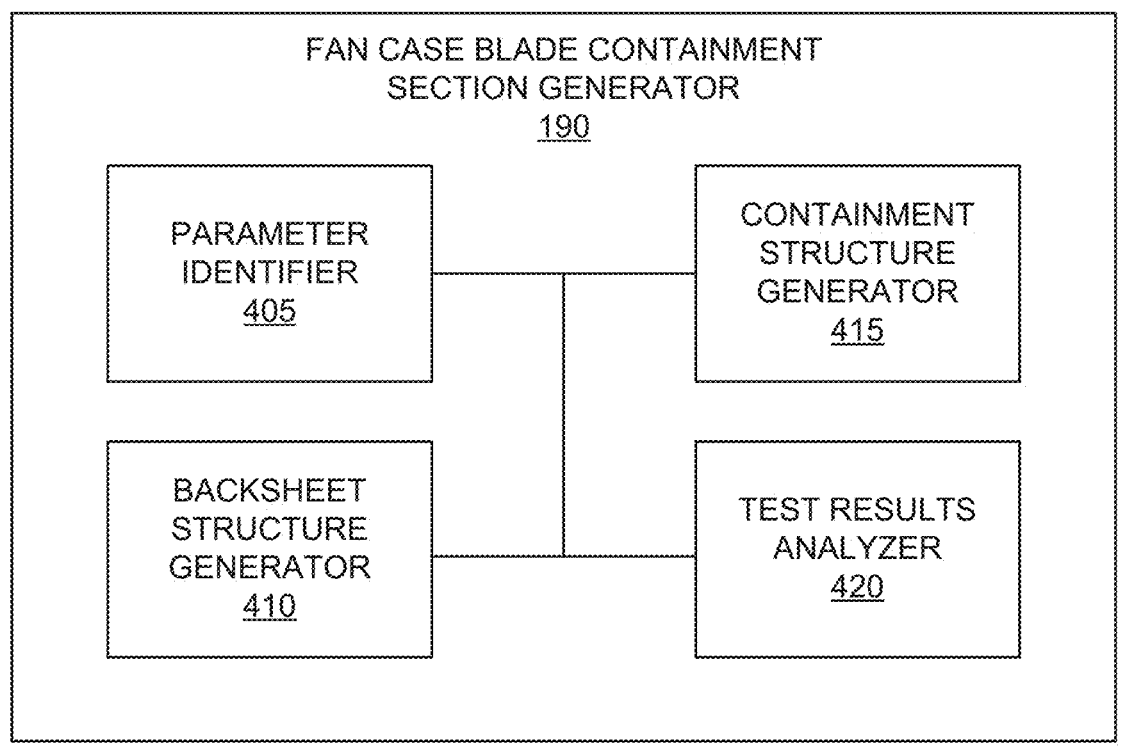
FIG. 4 is a block diagram of an example implementation of the gas engine fan case blade containment section generator of FIG. 1.

FIG. 4 is a block diagram 400 of an example implementation of the gas engine fan case blade containment section generator 190 of FIG. 1. The fan case blade containment section generator 190 includes an example parameter identifier 405, an example backsheet structure generator 410, an example containment structure generator 415, and an example test results analyzer 420.

The parameter identifier 405 can be used to identify parameters necessary for the design and/or fabrication of the gas engine fan case blade containment section generator 190 of FIG. 1, including the backsheet structure 240 and/or the containment structure 245. Certain measurements and/or inputs are necessary to determine the design of the segment backsheet structure 240 (e.g., number of segments, segment lengths, etc.). Such measurements and/or inputs can include total necessary circumferential of the honeycomb structure 210, highest and lowest anticipated temperatures at operation, highest and lowest anticipated stresses at operation, etc. The parameter identifier 405 can determine inputs needed to estimate the size of a containment structure 245. For example, the parameter identifier 405 can identify certain blade properties that are necessary to determine an anticipated blade penetration capability based on blade properties including size, shape, material properties, and kinetic energy. Other conditions necessary to optimize the design and/or fabrication process of the fan case blade containment 178A and/or fan case blade containment 178B can be determined using the parameter identifier 405, including operating conditions (e.g., subsonic and/or supersonic). For example, based on the input parameter values, the final design, composition, and/or fabrication process of the backsheet and/or the containment structure(s) can vary based on set regulatory requirements.

The backsheet structure generator 410 can be used to form the backsheet structure segments (e.g., segments 305 and/or 310 of varying length and/or thickness). The backsheet structure generator 410 can further position the segments to form asymmetrically overlapping sections of the backsheet that can be riveted to each other (e.g., using rivets and/or bolts 235). The backsheet structure generator 410 can be used to alter the shape and/or length and/or thickness of the backsheet segments based on a set of test results determined using the test results analyzer 420 during initial testing of different backsheet structure designs. For example, the backsheet structure generator 410 can be used form different versions of segmented backsheet structures to determine (e.g., using established testing techniques to investigate modal stiffness and/or resistance to vibratory modes) the level of segmentation necessary to attain circumferential crack-arresting of the backsheet structure. Furthermore, the backsheet structure generator 410 can form multiple design variations of the backsheet for testing the effects of segment design features on the crack-arresting properties of the segmented backsheet structure 240.

The containment structure generator 415 can be used to form the removable containment structure 245 (e.g., containment cartridge). Once the parameter identifier 405 receives inputs of the blade properties that can be used to determine blade penetration capability and subsequently the required size of the containment cartridge 245, the containment structure generator 415 generates the appropriately-sized containment cartridge. Furthermore, the containment structure generator 415 can determine the type of material to be included in the containment cartridge (e.g., UHMWPE, Kevlar®, etc.) based, in part, on the intended operating conditions (e.g., subsonic and/or supersonic). The containment structure generator 415 can further modify the containment material and/or containment cartridge based on any input parameters (e.g., received using the parameter identifier 405). For example, the containment cartridge structure generator 415 can wrap and/or encapsulate the containment material in a fire-retarding material (e.g., fiberglass). Once the backsheet structure 240 and the containment structure 245 are formed, the fan case blade containment section generator 190 can be used to combine the two structures together and integrate with the rest of the fan case blade containment sections (e.g., honeycomb structure 210, fan case 205, etc.).

The test results analyzer 420 analyzes testing results obtained to determine the backsheet structure design and/or containment structure design that meets regulatory and other established guidelines for use in a fan case blade containment section. The test results analyzer 420 can include assessment of results obtained during impact tests used to induce realistic damage of blade fan case penetration and crack propagation tests performed under stimulated engine windmilling fatigue loads, with additional assessment of the level of secondary damage. Based on the testing results provided by the test results analyzer 420, the designs can be altered and/or adjusted to meet the necessary structural and functional properties of the fan case blade containment compartments (e.g., crack-arresting of the backsheet structure and/or removable coupling of the containment structure).

While an example manner of implementing the gas engine fan case blade containment section generator 190 of FIG. 1 is illustrated in FIG. 4, one or more of the elements, processes and/or devices illustrated in FIG. 4 may be combined, divided, re-arranged, omitted, eliminated and/or implemented in any other way. Further, the example parameter identifier 405, the example backsheet structure generator 410, the example containment structure generator 415, the example test results analyzer 420, and/or, more generally, the example fan case blade containment section generator 190 of FIG. 4 may be implemented by hardware, software, firmware and/or any combination of hardware, software and/or firmware. Thus, for example, any of the example parameter identifier 405, the example backsheet structure generator 410, the example containment structure generator 415, the example test results analyzer 420, and/or, more generally, the example fan case blade containment section generator 190 of FIG. 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example parameter identifier 405, the example backsheet structure generator 410, the example containment structure generator 415, and/or, more generally, the example test results analyzer 420 of FIG. 4 is/are hereby expressly defined to include a non-transitory computer readable storage device or storage disk such as a memory, a digital versatile disk (DVD), a compact disk (CD), a Blu-ray disk, etc. including the software and/or firmware. Further still, the example fan case blade containment section generator 190 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
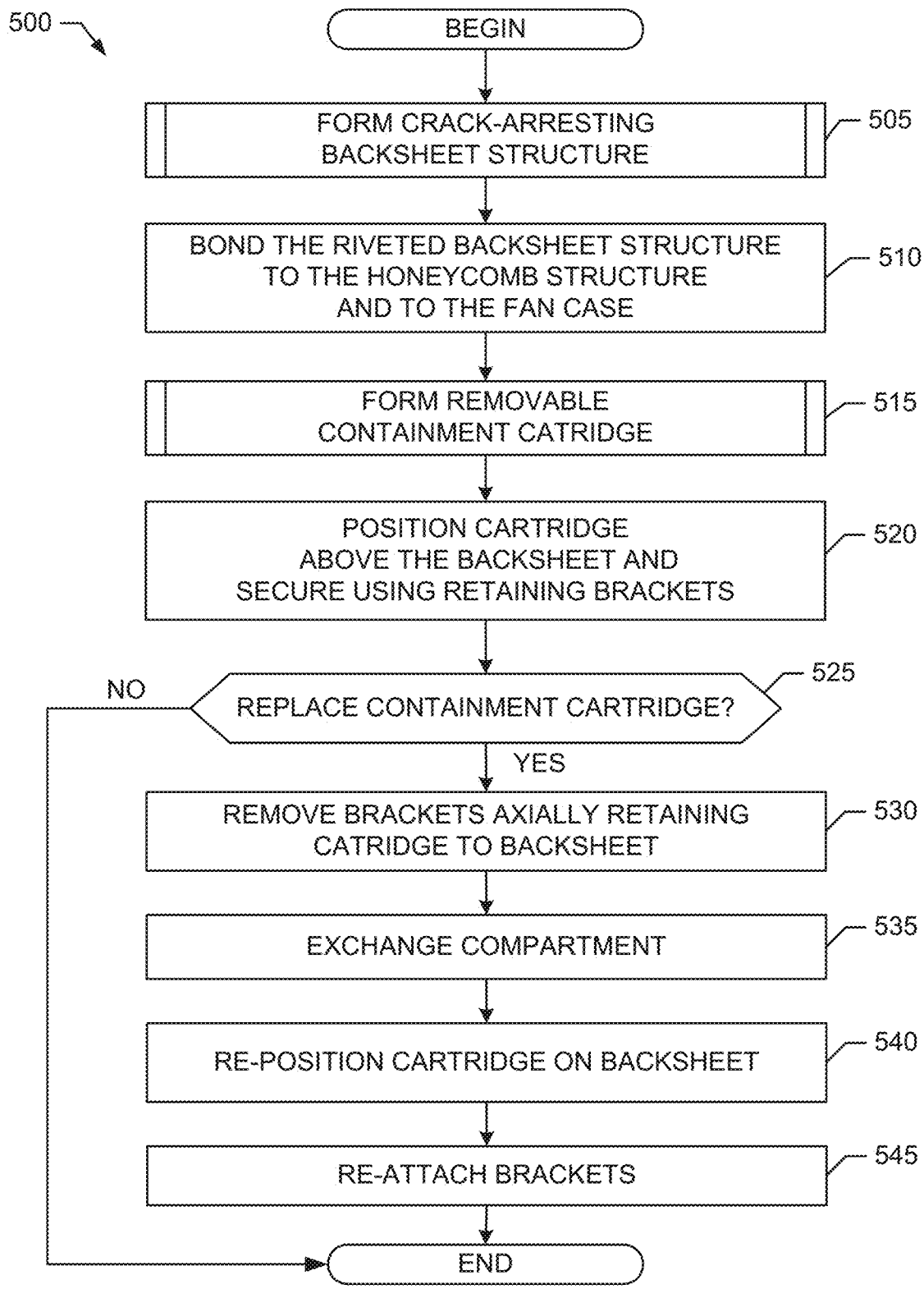
FIG. 5 illustrates a flowchart representative of example machine readable instructions which may be executed to implement the example gas engine fan case blade containment section generator of FIG. 1 and/or FIG. 4.
Figure 6:
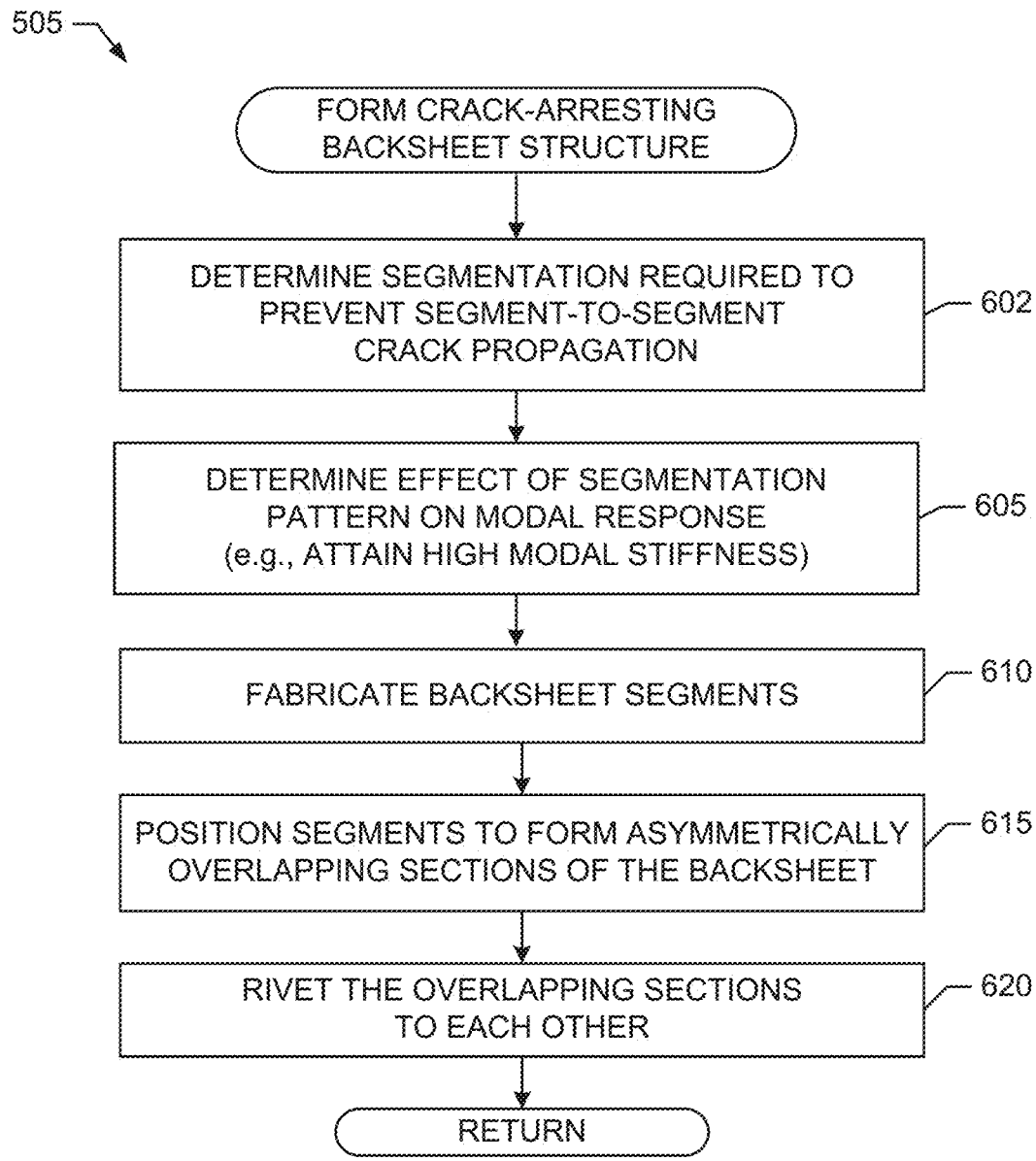
FIG. 6 illustrates a flowchart representative of example machine readable instructions which may be executed to implement a crack-arresting backsheet structure generator as part of the example gas engine fan case blade containment section generator of FIG. 1 and/or FIG. 4.
Figure 7:
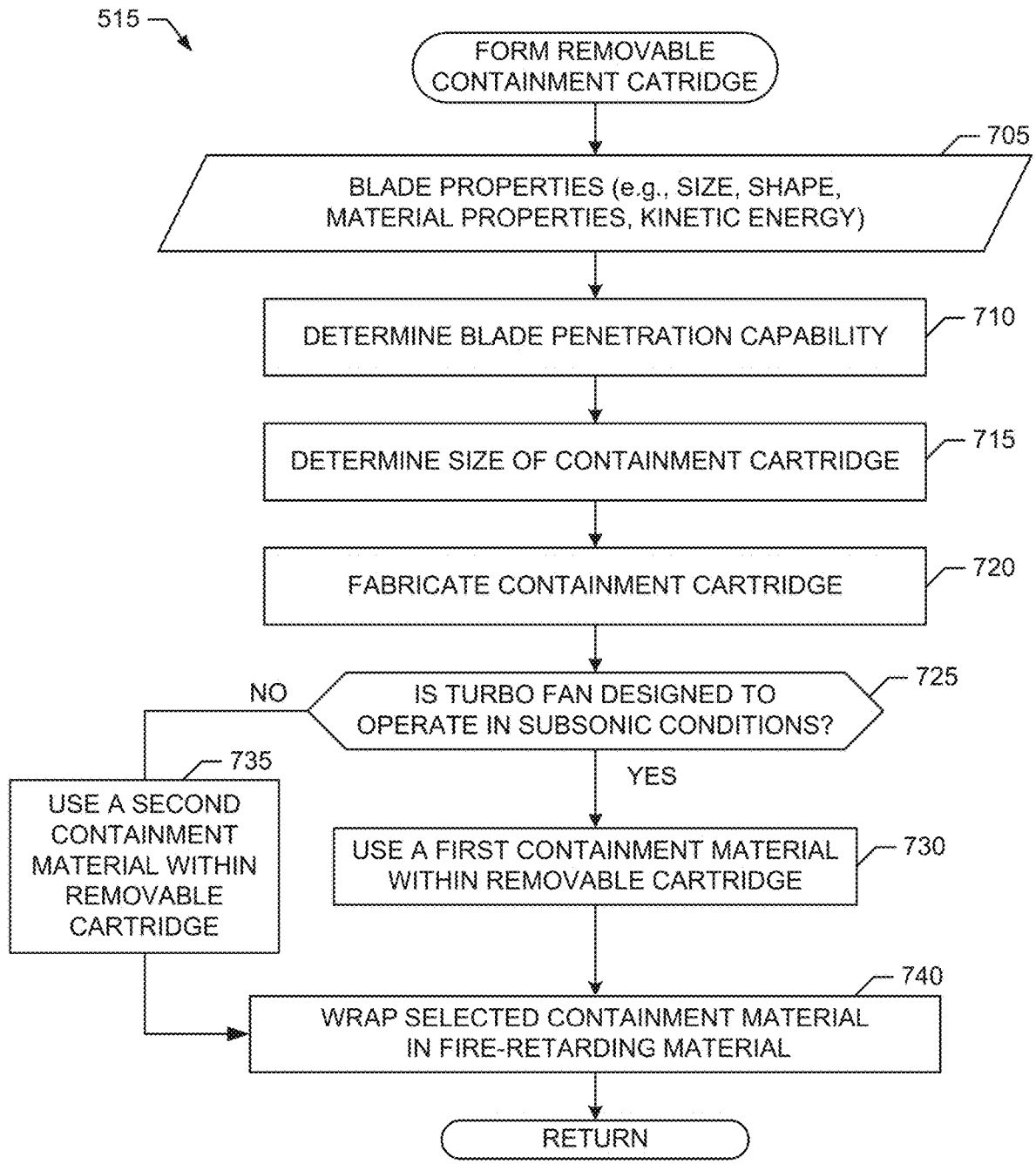
FIG. 7 illustrates a flowchart representative of example machine readable instructions which may be executed to implement a removable containment structure generator as part of the example gas engine fan case blade containment section generator of FIG. 1 and/or FIG. 4.

A flowchart representative of example hardware logic, machine readable instructions, hardware implemented state machines, and/or any combination thereof for implementing the fan case blade containment section generator 190 of FIG. 4 is shown in FIGS. 5-7. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIGS. 5-7, many other methods of implementing the example fan case blade containment section generator 190 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 5 illustrates a flowchart 500 representative of example machine readable instructions which may be executed to implement the fan case blade containment section generator of FIG. 1 and/or FIG. 4. The formation of the fan case blade containment section 178A and/or 178B can be achieved through fabrication of the crack-arresting backsheet structure 240 and the removable containment cartridge 245 using the fan case blade containment section generator 190. The crack-arresting backsheet structure 240 can be used with a non-removable containment cartridge, while the removable containment cartridge 245 can be used with a non-segmented or partially-segmented backsheet structure. The backsheet structure generator 410 forms the crack-arresting backsheet structure (block 505) and bonds the backsheet structure segments (e.g., backsheet segments riveted to each other using rivets and/or bolts 235). The fan case blade containment section generator 190 further bonds the backsheet structure to the honeycomb structure 210 and/or to the fan case 205 (block 510). Once the containment structure generator 415 forms the removable containment cartridge 245 (block 515), the fan case blade containment section generator 190 positions the containment cartridge 245 above the backsheet structure 240 and secures it using retaining brackets (e.g., retaining brackets 223 and/or 230) (block 520). When the cartridge 245 is to be replaced for purposes of inspection and/or maintenance (block 525), the brackets (e.g., bracket(s) 223 and/or 230) axially retaining the cartridge 245 to the backsheet structure 240 can be removed (block 530), the cartridge 245 and/or the containment material 250 can be replaced (block 535), and the cartridge 245 and/or a new cartridge can be repositioned on the backsheet 240 (block 540) using the brackets 223 and/or 230 (block 545).

FIG. 6 illustrates a flowchart 505 representative of example machine readable instructions which may be executed to implement a crack-arresting backsheet structure generator as part of the gas engine fan case blade containment section generator of FIG. 1 and/or FIG. 4. The backsheet structure 240 segmentation can be determined using the test results analyzer 420 based on, for example, a modal analysis, in order to identify segmentations that independently result in prevention of segment-to-segment crack propagation and/or resistance to vibratory modes, as discussed in connection with FIGS. 2-3. The backsheet structure generator 410 can be used to determine segmentation to prevent segment-to-segment crack propagation (block 602), followed by determining effects of a select segmentation pattern on a modal response (block 605). In some examples, the segmentation can be optimized or otherwise improved depending on whether resistance to both or only one of the segment-to-segment crack propagation and/or vibratory mode formation is desired. This permits the identification of backsheet segmentation that attains circumferential crack arresting (e.g., backsheet segment lengths and/or overlaps that result in crack arresting and/or resistance to vibratory mode formation, which can, in some examples, vary depending on the position of the backsheet relative to the honeycomb structure 210 and/or the fan case 205). Once the backsheet segment lengths are established, the backsheet structure generator 410 fabricates the backsheet using any manufacturing process acceptable for gas turbine engine manufacturing purposes (e.g., casting, alloying, molding, 3D-printing, etc.) (block 610). The backsheet structure generator 410 positions the segments to form asymmetrically overlapping sections of the backsheet 240, as described in more detail in connection with FIG. 3 (block 615). The backsheet structure generator 410 rivets the segments to each other (e.g., using rivets and/or bolts 235) (block 620). In some examples, the fan case blade containment section generator 190 binds the riveted segments forming the backsheet structure 240 to the fan case 205 and/or the honeycomb structure 210.

FIG. 7 illustrates a flowchart 515 representative of example machine readable instructions which may be executed to implement a removable containment structure generator as part of the gas engine fan case blade containment section generator of FIG. 1 and/or FIG. 4. The parameter identifier 405 identifies parameters necessary to determine the size of the removable containment cartridge 245. Such parameters can be based on blade properties (e.g., blade size, shape, material properties, and/or kinetic energy), which dictate how the containment cartridge 245 must be designed to allow for a blade and/or a blade fragment retention during a blade out event (block 705). Based on these parameters, the fan case blade containment section generator 190 determines blade penetration capability (block 710), in order to properly select the material properties of the containment material 250. The size of the containment cartridge 245 can therefore be determined by the fan case blade containment section generator 190 based on the intended containment material and the provided blade and/or blade fragment properties (block 715). The containment structure generator 415 forms the containment cartridge 245 using any manufacturing process acceptable for gas turbine engine manufacturing purposes and/or containment cartridge manufacturing (e.g., casting, alloying, molding, 3D-printing, weaving of polymer fibers, etc.) (block 720). Depending on the environment in which the containment cartridge 245 is intended for use (e.g., supersonic versus subsonic flight conditions), the containment structure generator 415 selects the containment material 250 properties accordingly. If a turbo fan is intended for operation in subsonic conditions (block 725), the containment structure generator 415 selects a first containment material for use within the removable cartridge (e.g., a material compatible with subsonic conditions) (block 730). The containment material 250 used for subsonic conditions can be Ultra High Molecular Weight Polyethylene (UHMWPE) (e.g., DuPont' Tensylon® HA120), given that UHMWPE fibers are the strongest and lightest fibers, providing a combination of high strength and low density. If a turbofan 110 is intended for use in, for example, supersonic conditions, the containment cartridge generator 415 selects a material (e.g., a second containment material) for use within the removable cartridge 245 that is able to withstand operating temperatures significantly higher than those the containment material 250 would be exposed to at subsonic conditions (e.g., temperatures in the fan containment section area can exceed 400 degrees Fahrenheit in supersonic engines) (block 735). Given the high temperatures experienced by the fan case compartment, the containment structure generator 4415 wraps the containment material 250 in fire-retarding material (e.g., encapsulated in fiberglass) (block 740). Furthermore, the containment material 250 can be replaced and/or exchanged within the containment cartridge 245 as part of routine maintenance, inspection, and/or expected operations at varying conditions that require containment material 250 changes.

Figure 8:
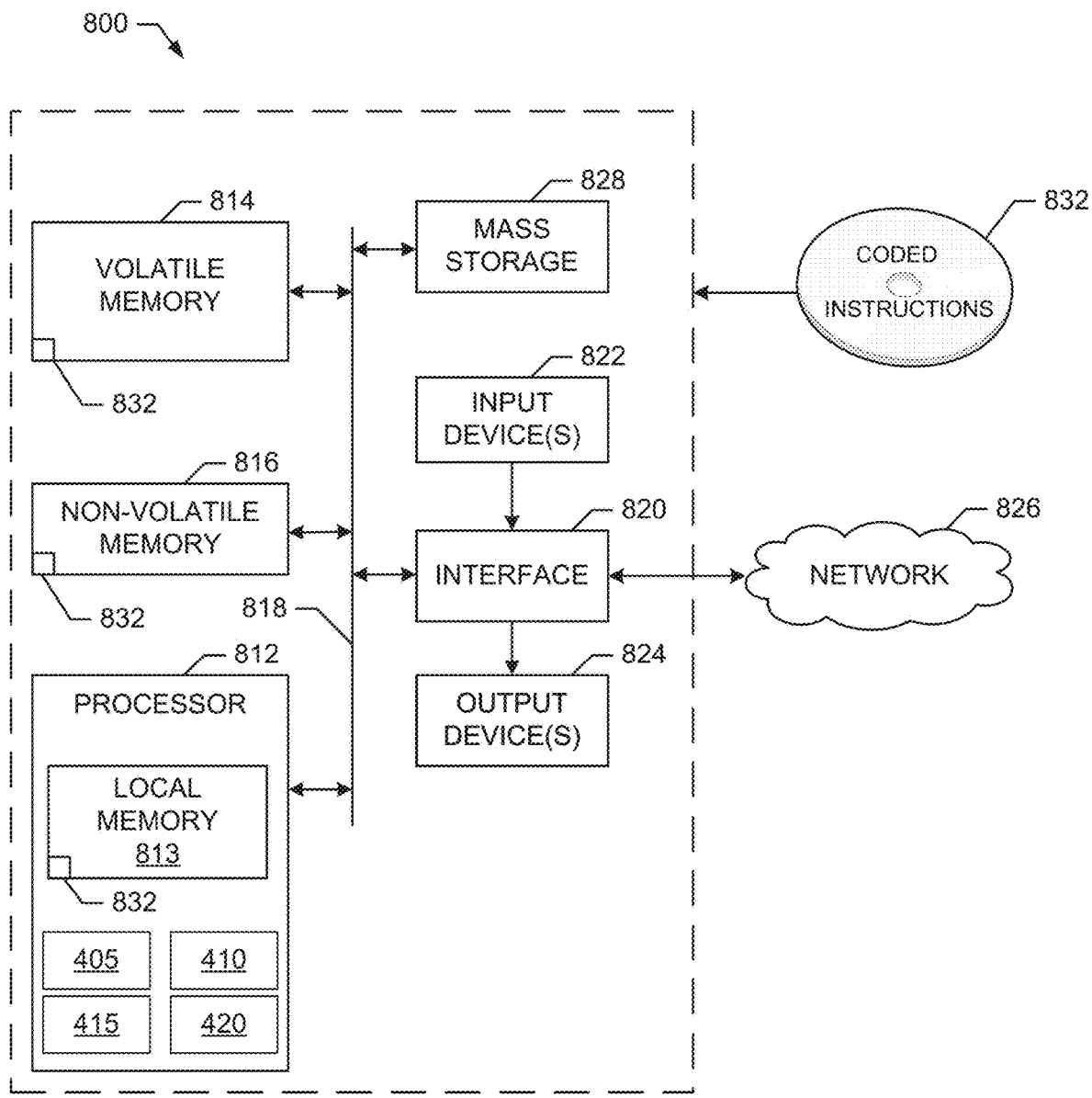
FIG. 8 is a block diagram of an example processing platform structured to execute the instructions of FIGS. 5-7 to implement the example gas engine fan case blade containment section generator of FIG. 1 and/or FIG. 4.

FIG. 8 is a block diagram of an example processing platform 800 structured to execute the instructions of FIGS. 5-7 to implement the gas engine fan case blade containment section generator of FIG. 1 and/or FIG. 4. The processor platform 800 can be, for example, a server, a personal computer, a workstation, a self-learning machine (e.g., a neural network), or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 812 implements the example parameter identifier 405, the example backsheet structure generator 410, the example containment structure generator 415, and the example test results analyzer 420.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) 822 can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 5-7 may be stored in the mass storage device 828, in the volatile memory 814, in the non-volatile memory 816, and/or on a removable non-transitory computer readable storage medium such as a CD or DVD.

From the foregoing, it will be appreciated that the disclosed fan case with a crack-arresting backsheet structure and a removable containment cartridge can be used to reduce the incidence of fan case damage in a gas turbine engine and/or permit efficient replacement and/or maintenance of a blade fragment containment cartridge. The softwall fan case includes a backsheet with overlapping segments made of a metallic or composite material, such that the segmentation of the backsheet creates a crack-arresting backsheet structure with an asymmetric modal stiffness that produces resistance to formation of vibratory modes (e.g., traveling waves and avoidance of resonance) and/or crack propagation. For example, vibration can cause crack formation and propagation, such that high vibration of turbine blades can result in higher mechanical stresses, leading to high cycle fatigue. The segmented backsheet structure permits the break-up of traveling wave formations, thereby reducing the occurrence of crack propagation (e.g., segmentation provides extra damping that breaks up the formation of traveling waves which promote crack propagation of the fan case). Furthermore, the segmentation to prevent segment-to-segment crack propagation may be different from the segmentation to create a resistance to vibratory modes. For example, uniform segmentation can provide resistance to crack propagation, whereas non-uniform segmentation can provide resistance to vibratory mode formation. The segments of the backsheet can be positioned in non-equal lengths circumferentially, thereby breaking up traveling wave formations as a result of the presence of an asymmetric structure (e.g., a non-repetitive structure). Furthermore, the segmented backsheet structure provides blade nesting space, high modal stiffness, and circumferential crack-arresting of the backsheet, ensuring the presence of a backup structure in the event that a flowpath is severely damaged during a fan blade-out event. The fan case further includes a removable containment cartridge for retention of blade fragments during a blade-out event. For example, the softwall containment provided includes a containment cartridge that is axially retained by brackets. The containment cartridge can be manufacturing using wraps of ultrahigh molecular weight polyethylene (UHMWPE) (e.g., DuPont' Tensylon® HA120, etc.). However, any type of material that meets the established requirements of composite material use in containment structures (e.g., to provide energy-absorbing capabilities and permit weight reduction, localize the damage area while maintaining sufficient structural integrity, etc.) can be used. The containment wraps can be encapsulated by fibrous composite plies (e.g., fiberglass). In the examples disclosed herein, the containment structure is designed to be replaceable, such that a containment cartridge can be removed and replaced with a new containment cartridge with less effort once degradation of the containment occurs over time, requiring standard changes (e.g., every 3-4 years), given that actual occurrence of a blade-out event is rare. As such, the examples disclosed herein allow for improved inspection and maintenance of a fan case, given that the containment cartridge can be easily removed instead of being bonded to the rest of the fan case structure (e.g., detection of environmental-based corrosion can occur more quickly, etc.). For example, current examples of fan case designs include elastic compliant blade containment belts of several Kevlar® fabric plies that are bonded to the fan case structure instead of being removable, making inspection and maintenance more difficult than would be possible in the presence of a removable containment structure as described in the examples disclosed herein.

The presently described technology can be implemented according to a plurality of examples. In certain examples, the segmented backsheet structure 240 provides a means for shrouding a rotor blade, the means for shrouding the rotor blade including at least a first backsheet segment of a first length and a second backsheet segment of a second length, the backsheet segments coupled to each other and to the fan case. In certain examples, the containment structure 245 provides a means for retaining a rotor blade fragment, the means for retaining a rotor blade fragment coupled to the means for shrouding the rotor blade.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

Further aspects of the invention are provided by the subject matter of the following clauses:

An engine fan case including a segmented backsheet structure, the segmented backsheet structure including at least a first backsheet segment of a first length and a second backsheet segment of a second length, the first backsheet segment coupled to the second backsheet segment and at least one of the first backsheet segment or the second backsheet segment coupled to the fan case. The engine fan case further includes a containment structure for blade fragment retention, the containment structure coupled to the segmented backsheet structure.

The engine fan case of any preceding clause wherein the segmented backsheet structure includes a third backsheet segment of a third length, wherein a first spacing between the first segment and the second segment is asymmetric relative to a second spacing between the second segment and the third segment.

The engine fan case of any preceding clause wherein the first and second backsheet segments are circumferentially-coupled using at least one of a shiplap, double-shiplap, or double overlap connection.

The engine fan case of any preceding clause wherein the first and second backsheet segments are axially-coupled to the fan case using one or more fasteners.

The engine fan case of any preceding clause wherein the first and second backsheet segments include at least one of an aluminum, a polymer matrix composite, or a titanium material.

The engine fan case of any preceding clause wherein the containment structure is to retain a blade or blade fragment during a blade out event.

The engine fan case of any preceding clause further including a honeycomb structure, the first and second backsheet segments of the segmented backsheet structure coupled to the honeycomb structure.

An engine fan case comprising a backsheet structure coupled to a honeycomb structure, and a containment cartridge, the containment cartridge removably coupled to the backsheet structure using brackets, the containment cartridge including a containment material wrapped in a fire-retarding material to retain blade fragments.

The engine fan case of any preceding clause wherein the containment material is encapsulated in fiberglass.

The engine fan case of any preceding clause wherein, when the engine is to operate at subsonic conditions, the containment material is Ultra High Molecular Weight Polyethylene (UHMWPE).

A method of securing a backsheet structure to a containment cartridge, the method including positioning segmented backsheet sections in asymmetrical overlaps, the segmented sections having varying lengths, riveting the segmented sections at the asymmetrical overlaps to form the backsheet structure, bonding the riveted section overlaps to a fan case honeycomb structure, and removably coupling the containment cartridge to the backsheet structure to allow replacement of the cartridge, the containment cartridge axially retained with brackets.

The method of any preceding clause further including circumferentially-coupling the backsheet segments together using at least one of a shiplap, double-shiplap, or double overlap connection.

The method of any preceding clause further including axially-coupling the backsheet segments to the fan case using one or more fasteners.

The method of any preceding clause further including removing the brackets axially retaining the cartridge to the backsheet structure, exchanging the cartridge, and re-positioning the cartridge on the backsheet using the brackets.

The method of any preceding clause further including determining a segmentation producing high modal stiffness of the backsheet structure to attain circumferential crack-arresting of the backsheet structure.

The method of any preceding clause wherein determining the segmentation of the backsheet structure includes at least one of determining segmentation producing resistance to segment-to-segment crack propagation or determining segmentation producing resistance to a vibratory mode, the vibratory mode including traveling wave-induced crack propagation.

The method of any preceding clause further including determining a size of a containment structure for blade fragment retention based on engine fan blade properties and penetration capability, the blade properties including blade size, blade shape, blade material properties, or blade kinetic energy.

The method of any preceding clause further including encapsulating a containment material of the containment cartridge in fiberglass, wherein the containment material is a Ultra High Molecular Weight Polyethylene (UHMWPE) material.

An engine fan case including means for shrouding a rotor blade, the means for shrouding the rotor blade including at least a first backsheet segment of a first length and a second backsheet segment of a second length, the backsheet segments coupled to each other and to the fan case, and means for retaining a rotor blade fragment, the means for retaining a rotor blade fragment coupled to the means for shrouding the rotor blade.

The engine fan case of any preceding clause wherein the means for shrouding a rotor blade further includes a third backsheet segment of a third length, a first spacing between the first backsheet segment and the second backsheet segment asymmetric relative to a second spacing between the second segment and the third segment.

An engine including a fan case, the fan case including a segmented backsheet structure, the segmented backsheet structure including at least a first backsheet segment of a first length and a second backsheet segment of a second length, the first backsheet segment coupled to the second backsheet segment and at least one of the first backsheet segment or the second backsheet segment coupled to the fan case, and a containment structure for blade fragment retention, the containment structure coupled to the segmented backsheet structure.

The engine of any preceding clause wherein the segmented backsheet structure includes a third backsheet segment of a third length, wherein a first spacing between the first segment and the second segment is asymmetric relative to a second spacing between the second segment and the third segment.

The engine of any preceding clause wherein the first and second backsheet segments are circumferentially-coupled using at least one of a shiplap, double-shiplap, or double overlap connection.

The engine of any preceding clause wherein the first and second backsheet segments are axially-coupled to the fan case using one or more fasteners.

The engine of any preceding clause wherein the first and second backsheet segments include at least one of an aluminum, a polymer matrix composite, or a titanium material.

The engine of any preceding clause wherein the containment structure is to retain a blade or blade fragment during a blade out event.

The engine of any preceding clause further including a honeycomb structure, the first and second backsheet segments of the segmented backsheet structure coupled to the honeycomb structure.

An engine including a fan case, the fan case including a backsheet structure coupled to a honeycomb structure, and a containment cartridge, the containment cartridge removably coupled to the backsheet structure using brackets, the containment cartridge including a containment material wrapped in a fire-retarding material to retain blade fragments.

The engine of any preceding clause wherein the containment material is encapsulated in fiberglass.

The engine of any preceding clause wherein, when the engine is to operate at subsonic conditions, the containment material is Ultra High Molecular Weight Polyethylene (UHMWPE).

What is claimed is:

1. An engine fan case comprising:
   a segmented backsheet structure, the segmented backsheet structure including at least a first backsheet segment of a first length and a second backsheet segment of a second length, the first backsheet segment coupled to the second backsheet segment and at least one of the first backsheet segment or the second backsheet segment coupled to the fan case, wherein the segmented backsheet structure includes a third backsheet segment of a third length, a first spacing between the first segment and the second segment asymmetric relative to a second spacing between the second segment and the third segment; and
   a containment structure for blade fragment retention, the containment structure coupled to the segmented backsheet structure.

2. The fan case of claim 1, wherein the first and second backsheet segments are circumferentially-coupled using at least one of a shiplap, double-shiplap, or double overlap connection.

3. The fan case of claim 1, wherein the first and second backsheet segments are axially-coupled to the fan case using one or more fasteners.

4. The fan case of claim 1, wherein the first and second backsheet segments include at least one of an aluminum, a polymer matrix composite, or a titanium material.

5. The fan case of claim 1, wherein the containment structure is to retain a blade or blade fragment during a blade out event.

6. The fan case of claim 1, further including a honeycomb structure, the first and second backsheet segments of the segmented backsheet structure coupled to the honeycomb structure.

7. An engine fan case comprising:
   a backsheet structure coupled to a honeycomb structure; and a containment cartridge, the containment cartridge removably coupled to the backsheet structure using brackets, the containment cartridge including a containment material wrapped in a fire-retarding material to retain blade fragments.

8. The fan case of claim 7, wherein the containment material is encapsulated in fiberglass.

9. The fan case of claim 7, wherein, when the engine is to operate at subsonic conditions, the containment material is Ultra High Molecular Weight Polyethylene (UHMWPE).

10. A method of securing a backsheet structure to a containment cartridge, the method comprising:
  positioning segmented backsheet sections in asymmetrical overlaps, the segmented sections having varying lengths, the segmented backsheet sections including a first backsheet section spaced a first distance from a second backsheet section and a third backsheet section spaced a second distance from the second backsheet section, the first distance different than the second distance;
  riveting the segmented sections at the asymmetrical overlaps to form the backsheet structure;
  bonding the riveted section overlaps to a fan case honeycomb structure; and
  removably coupling the containment cartridge to the backsheet structure to allow replacement of the cartridge, the containment cartridge axially retained with brackets.

11. The method of claim 10, further including circumferentially-coupling the backsheet segments together using at least one of a shiplap, double-shiplap, or double overlap connection.

12. The method of claim 10, further including axially-coupling the backsheet segments to the fan case using one or more fasteners.

13. The method of claim 10, further including removing the brackets axially retaining the cartridge to the backsheet structure, exchanging the cartridge, and re-positioning the cartridge on the backsheet using the brackets.

14. The method of claim 10, further including determining a segmentation producing high modal stiffness of the backsheet structure to attain circumferential crack-arresting of the backsheet structure.

15. The method of claim 14, wherein determining the segmentation of the backsheet structure includes at least one of determining segmentation producing resistance to segment-to-segment crack propagation or determining segmentation producing resistance to a vibratory mode, the vibratory mode including traveling wave-induced crack propagation.

16. The method of claim 10, further including determining a size of a containment structure for blade fragment retention based on engine fan blade properties and penetration capability, the blade properties including blade size, blade shape, blade material properties, or blade kinetic energy.

17. The method of claim 10, further including encapsulating a containment material of the containment cartridge in fiberglass, wherein the containment material is a Ultra High Molecular Weight Polyethylene (UHMWPE) material.

18. An engine fan case comprising:
  means for shrouding a rotor blade, the means for shrouding the rotor blade including at least a first backsheet segment of a first length and a second backsheet segment of a second length, the backsheet segments coupled to each other and to the fan case;
  means for retaining a rotor blade fragment, the means for retaining a rotor blade fragment coupled to the means for shrouding the rotor blade; and
  means for shrouding a rotor blade further includes a third backsheet segment of a third length, a first spacing between the first backsheet segment and the second backsheet segment asymmetric relative to a second spacing between the second segment and the third segment.

* * * * *